(12) United States Patent
Patton

(10) Patent No.: US 9,902,325 B1
(45) Date of Patent: Feb. 27, 2018

(54) PORTABLE CLIMBING SYSTEM

(71) Applicant: Craig Patton, Carlisle, PA (US)

(72) Inventor: Craig Patton, Carlisle, PA (US)

( * ) Notice: Subject to any disclaimer, the term of this patent is extended or adjusted under 35 U.S.C. 154(b) by 0 days.

(21) Appl. No.: 15/379,849

(22) Filed: Dec. 15, 2016

(51) Int. Cl.
*B60R 3/02* (2006.01)
*B60R 25/00* (2013.01)
*B60R 3/00* (2006.01)

(52) U.S. Cl.
CPC .................................. *B60R 3/007* (2013.01)

(58) Field of Classification Search
CPC ......... B60R 3/02; B60R 3/007; B62D 33/027; B62D 25/00
See application file for complete search history.

(56) References Cited

U.S. PATENT DOCUMENTS

| | | | |
|---|---|---|---|
| 2,975,858 A | 3/1961 | Billingsley | |
| 3,853,369 A | 12/1974 | Holden | |
| 4,639,032 A | 1/1987 | Barbour | |
| D296,887 S | 7/1988 | Walling et al. | |
| 4,846,487 A | 7/1989 | Criley | |
| 5,732,996 A | 3/1998 | Graffy et al. | |
| 6,422,342 B1 | 7/2002 | Armstrong et al. | |
| 7,059,648 B2 | 6/2006 | Livingston | |
| 7,673,922 B1 * | 3/2010 | Grimes | B60R 3/02 280/166 |
| 2005/0247519 A1 | 11/2005 | Reid | |

* cited by examiner

*Primary Examiner* — Bryan Evans

(57) ABSTRACT

A portable climbing system for mounting a tailgate includes a vehicle that has a tailgate. The tailgate has a front edge, a back edge and a first surface extending therebetween. The first surface is horizontally oriented when the tailgate is positioned in an open position. A climbing unit is removably coupled to the tailgate when the tailgate is positioned in the open position. The climbing unit facilitates climbing onto the tailgate from the ground.

7 Claims, 3 Drawing Sheets

PORTABLE CLIMBING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION (1) Field of the Invention.

(2) Description of Related Art including information disclosed under 37 CFR 1.97 and 1.98.

The disclosure and prior art relates to climbing devices and more particularly pertains to a new climbing device for mounting a tailgate.

BRIEF SUMMARY OF THE INVENTION

An embodiment of the disclosure meets the needs presented above by generally comprising a vehicle that has a tailgate. The tailgate has a front edge, a back edge and a first surface extending therebetween. The first surface is horizontally oriented when the tailgate is positioned in an open position. A climbing unit is removably coupled to the tailgate when the tailgate is positioned in the open position. The climbing unit facilitates climbing onto the tailgate from the ground.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
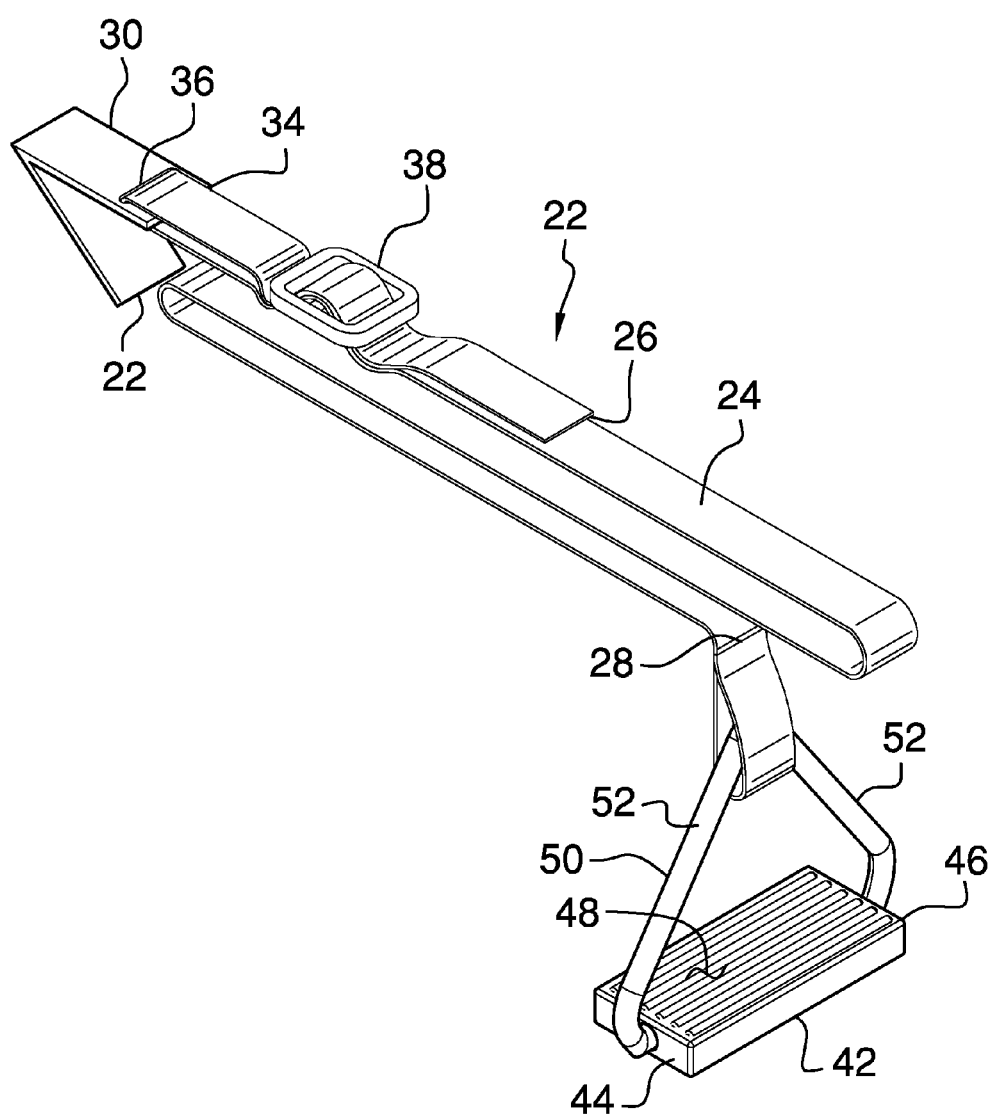
FIG. 1 is a perspective view of a climbing unit of a portable climbing system according to an embodiment of the disclosure.
Figure 2:
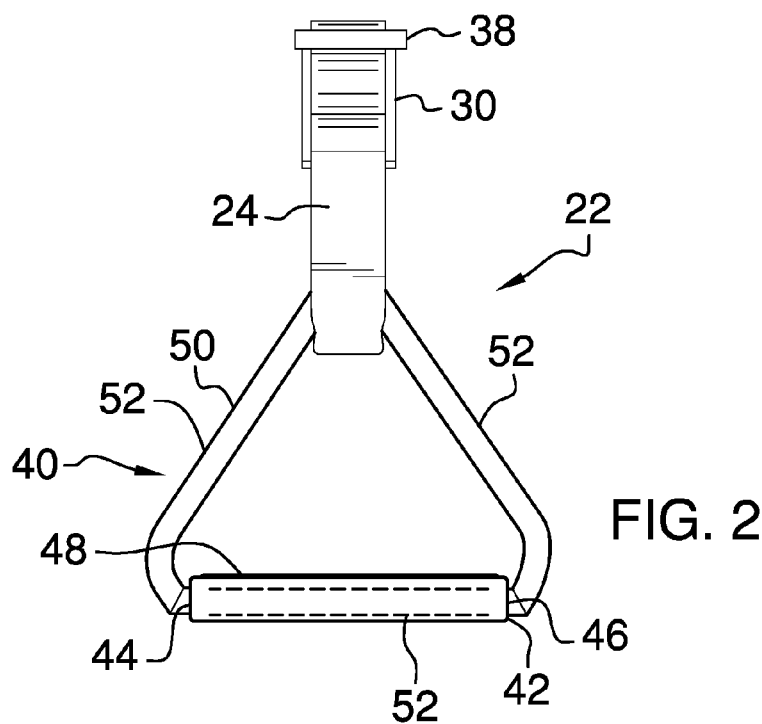
FIG. 2 is a front view of climbing unit of an embodiment of the disclosure.
Figure 3:
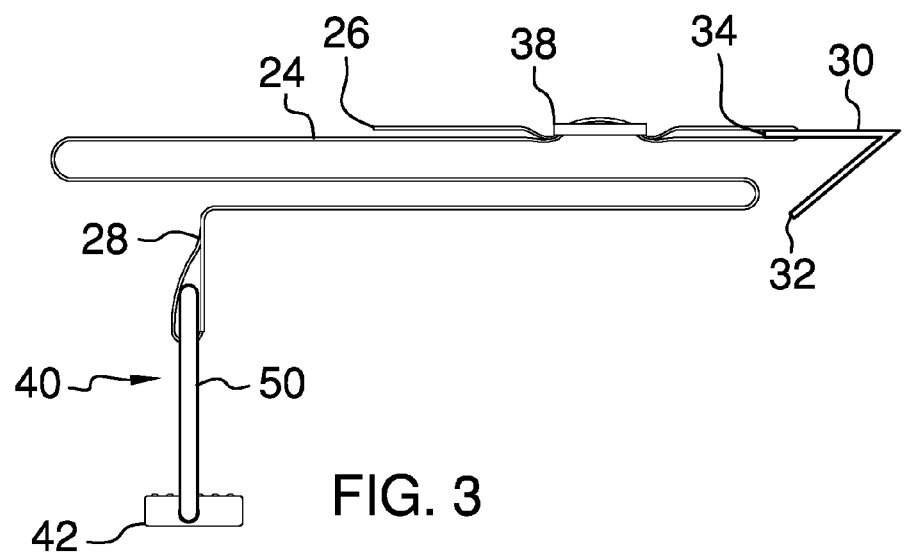
FIG. 3 is a right side view of a climbing unit of an embodiment of the disclosure.
Figure 4:
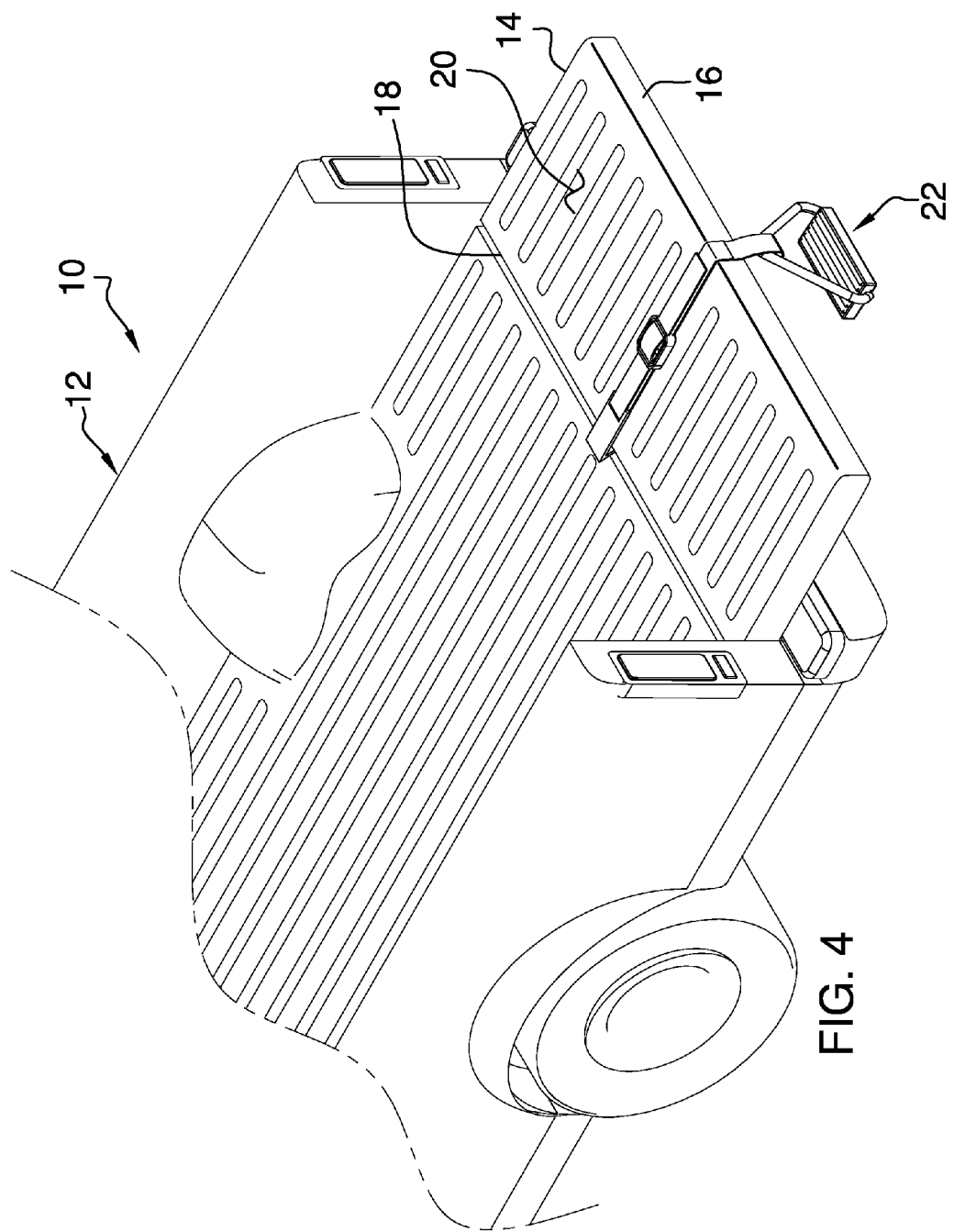
FIG. 4 is a perspective in-use view of an embodiment of the disclosure.

With reference now to the drawings, and in particular to FIGS. 1 through 4 thereof, a new climbing device embodying the principles and concepts of an embodiment of the disclosure and generally designated by the reference numeral 10 will be described.

As best illustrated in FIGS. 1 through 4, the portable climbing system 10 generally comprises a vehicle 12 has a tailgate 14. The tailgate 14 has a front edge 16, a back edge 18 and a first surface 20 extending therebetween. The first surface 20 is horizontally oriented when the tailgate 14 is positioned in an open position. Moreover, the vehicle 12 may be a pickup truck or other vehicle 12 having a tailgate 14.

A climbing unit 22 is provided and the climbing unit 22 is removably coupled to the tailgate 14 when the tailgate 14 is positioned in the open position. The climbing unit 22 facilitates climbing onto the tailgate 14 from the ground. The climbing unit 22 comprises a strap 24 that has a first end 26 and a second end 28. The strap 24 may have a length ranging between approximately 60.0 cm and 90.0 cm.

A grapple 30 is provided that has a front end 32 and a back end 34. The grapple 30 is bent between the front end 32 and the back end 34 thereby facilitating the grapple 30 to engage the back edge 18 of the tailgate 14 having the grapple 30 being positioned on the first surface 20. The grapple 30 has a slot 36 extending therethrough and the slot 36 is oriented collinear with the back end 34. The first end 26 of the strap 24 is extended through the slot 36 such that the grapple 30 is slidably coupled to the strap 24. Moreover, the strap 24 extends between the front edge 16 and the back edge 18 of the tailgate 14 when the grapple 30 engages the tailgate 14.

A buckle 38 is provided and the buckle 38 may be manipulated. The first end 26 of strap 24 extends through the buckle 38 thereby facilitating the buckle 38 to be selectively slid along the strap 24. The buckle 38 adjusts a length of the strap 24 between a minimum length and a maximum length. The buckle 38 is adjusted to facilitate the strap 24 to extend downwardly from the back edge 18 of the tailgate 14 having the second end 28 of the strap 24 being spaced a selected distance from the ground.

A step 40 is provided and the step 40 coupled to the second end 28 of the strap 24. The step 40 may be stepped on when the grapple 30 engages the tailgate 14 thereby facilitating mounting the tailgate 14. The step 40 comprises a panel 42 that has a first lateral edge 44, a second lateral edge 46 and a top surface 48 extending therebetween. The top surface 48 may be stepped upon and the top surface 48 is textured thereby enhancing traction on the top surface 48.

A support 50 is provided that has a plurality of intersecting members 52. The intersecting members 52 are arranged to form a triangle. One of the intersecting members 52 extends through the first lateral edge 44 and the second lateral edge 46 of the panel 42 such that the panel 42 is rotatably coupled to the support 50. The second end 28 of the strap 24 is coupled to the intersecting members 52 such that the panel 42 is retained on the strap 24. Each of the intersecting members 52 may have a length ranging between approximately 25.0 cm and 30.0 cm.

In use, the tailgate 14 is positioned in the open position and the grapple 30 is manipulated to engage the back edge 18 of the tailgate 14. The buckle 38 is manipulated to adjust the length of the strap 24. In this way the strap 24 extends downwardly from the front edge 16 of the tailgate 14 and the panel 42 is positioned a selected distance from the ground. The panel 42 is stepped on to enhance mounting the tailgate 14. The grapple 30 is removed from the tailgate 14 before the tailgate 14 is closed.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable climbing system comprising:
   a vehicle having a tailgate, said tailgate having a front edge, a back edge and a first surface extending therebetween, said first surface being horizontally oriented when said tailgate is positioned in an open position;
   a climbing unit being removably coupled to said tailgate when said tailgate is positioned in said open position wherein said climbing unit is configured to facilitate climbing onto said tailgate from the ground, said climbing unit including a strap having a first end and a second end; and
   a buckle being configured to be manipulated, said first end of strap extending through said buckle thereby facilitating said buckle to be selectively slid along said strap, said buckle adjusting a length of said strap between a minimum length and a maximum length.

2. The system according to claim 1, further comprising a grapple having a front end and a back end, said grapple being bent between said front end and said back end thereby facilitating said grapple to engage said back edge of said tailgate having said grapple being positioned on said first surface, said grapple having a slot extending therethrough, said slot being oriented collinear with said back end.

3. The system according to claim 2, wherein said first end of said strap is extended through said slot such that said grapple is slidably coupled to said strap having said strap extending between said front edge and said back edge of said tailgate when said grapple engages said tailgate.

4. The system according to claim 1, further comprising a step being coupled to said second end of said strap wherein said step is configured to be stepped on when said grapple engages said tailgate thereby facilitating mounting said tailgate.

5. The system according to claim 4, wherein said step comprises a panel having a first lateral edge, a second lateral edge and a top surface extending therebetween, said top surface being configured to be stepped upon.

6. A portable climbing system comprising:
   a vehicle having a tailgate, said tailgate having a front edge, a back edge and a first surface extending therebetween, said first surface being horizontally oriented when said tailgate is positioned in an open position;
   a climbing unit being removably coupled to said tailgate when said tailgate is positioned in said open position wherein said climbing unit is configured to facilitate climbing onto said tailgate from the ground, said climbing unit including a strap having a first end and a second end;
   a step being coupled to said second end of said strap wherein said step is configured to be stepped on when said grapple engages said tailgate thereby facilitating mounting said tailgate, said step including a panel having a first lateral edge, a second lateral edge and a top surface extending therebetween, said top surface being configured to be stepped upon; and
   a support having a plurality of intersecting members, said intersecting members being arranged to form a triangle, one of said intersecting members extending through said first lateral edge and said second lateral edge of said panel such that said panel is rotatably coupled to said support, said second end of said strap being coupled to said intersecting members such that said panel is retained on said strap.

7. A portable climbing system comprising:
   a vehicle having a tailgate, said tailgate having a front edge, a back edge and a first surface extending therebetween, said first surface being horizontally oriented when said tailgate is positioned in an open position; and
   a climbing unit being removably coupled to said tailgate when said tailgate is positioned in said open position wherein said climbing unit is configured to facilitate climbing onto said tailgate from the ground, said climbing unit comprising:
   a strap having a first end and a second end,
   a grapple having a front end and a back end, said grapple being bent between said front end and said back end thereby facilitating said grapple to engage said back edge of said tailgate having said grapple being positioned on said first surface, said grapple having a slot extending therethrough, said slot being oriented collinear with said back end, said first end of said strap being extended through said slot such that said grapple is slidably coupled to said strap having said strap extending between said front edge and said back edge of said tailgate when said grapple engages said tailgate,
   a buckle being configured to be manipulated, said first end of strap extending through said buckle thereby facilitating said buckle to be selectively slid along said strap, said buckle adjusting a length of said strap between a minimum length and a maximum length, and a step being coupled to said second end of said strap wherein said step is configured to be stepped on when said grapple engages said tailgate thereby facilitating mounting said tailgate, said step comprising:
- a panel having a first lateral edge, a second lateral edge and a top surface extending therebetween, said top surface being configured to be stepped upon, and
- a support having a plurality of intersecting members, said intersecting members being arranged to form a triangle, one of said intersecting members extending through said first lateral edge and said second lateral edge of said panel such that said panel is rotatably coupled to said support, said second end of said strap being coupled to said intersecting members such that said panel is retained on said strap.

\* \* \* \* \*